United States Patent Office 3,351,531
Patented Nov. 7, 1967

3,351,531
WHEAT GLUTEN-ENCAPSULATED DRIED OIL-IN-WATER DISPERSIONS OF FAT-SOLUBLE FOOD, MEDICAMENTS, FLAVORING AGENTS OR FOOD COLORING AGENTS
Peter P. Noznick, Evanston, and Charles W. Tatter, Homewood, Ill., assignors to Beatrice Foods Co., Chicago, Ill., a corporation of Delaware
No Drawing. Filed Aug. 9, 1965, Ser. No. 478,413
12 Claims. (Cl. 167—83)

This invention relates to an encapsulated product and more particularly to an encapsulated product which has a relatively slowly soluble film thereon.

There is frequently a need for an encapsulated product which will only release its contents over a prolonged period of time, or which will not release its contents until the lapse of a predetermined amount of time. For example, when food or medicine is taken internally, it may be desired to have the release extended over a relatively long period of time or it may be desired to have no release until after a predetermined period of time. Also it is sometimes desirable to have a flavoring agent or colorant released slowly during cooking, e.g., in baking.

It is, therefore, an object of the present invention to provide an encapsulated product which has a slowly soluble film thereon.

It is another object of the invention to provide an encapsulated product which is safe for human consumption.

Still other objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that an encapsulated product which is only slowly soluble can be prepared by using gluten as the basic material for the film covering the product. Gluten is the tough mass that remains after wheat-flour has been washed in water, and it is the material which gives dough its toughness. Gluten is a nutritious element of wheat and it is normally insoluble in neutral aqeous solution. The preferred form of gluten is vital wheat gluten.

According to a preferred embodiment of the invention, gluten is finely dispersed in acetic acid. This dispersion of gluten is then dispersed in an oil or fat to form an oil-in-water dispersion, with the oil or fat being the carrier for food or medicine or other material which is desired to be introduced by the use of the encapsulated product. An emulsifying agent may be added to the oil-in-water dispersion but it is not necessary to do so. The oil-in-water dispersion may be pasteurized and homogenized and then dried by any conventional means such as spray drying. The resultant encapsulated product is insoluble in neutral aqueous solution because of the presence of an enveloping gluten film thereon. This encapsulated product can be used in delayed release of the encapsulated material when taken internally since the acidic condition inside the body will help to dissolve the gluten film or it can be used in other delay release application, e.g., in baking.

Gluten can be dispersed in acetic acid and in alkali. Therefore, instead of acetic acid a volatile alkali such as ammonia may be used to peptize the gluten. Ammonia is non-toxic and can be driven off during drying to leave the gluten substantially insoluble in the neutral aqueous solution. Similarly, when acetic acid is used to disperse the gluten, the acid can also be driven off during the drying operation.

As the oil or fat there can be used saturated or unsaturated vegetable oils and animal fats either hydrogenated or not. Among the suitable edible fats which can be used are cottonseed oil, safflower oil, corn oil, soybean oil, butterfat, coconut oil, peanut oil, lard, chicken fats, hydrogenated cottonseed oil, hydrogenated corn oil, hydrogenated soybean oil, hydrogenated peanut oil, olive oil, hydrogenated olive oil, hydrogenated coconut oil, e.g., hydrogenated to a melting point of 92° F.

As already indicated, the addition of an emulsifying agent is optional but is preferred. Examples of suitable emulsifying agents are lecithin, glyceryl esters, glycol esters and polyglycerol esters of fatty acids.

Examples of the glyceryl esters are glyceryl lacto monopalmitate, glyceryl lacto monooleate, glyceryl lacto monostearate and the like as well as mono and diglycerides.

As the acid component of the esters to be used in the invention it is preferred to use the higher fatty acids, e.g., those containing 12 to 22 carbon atoms.

With respect to the polyglycerol esters, while polyglycerol esters from diglycerol to triconto (30 glycerol units) glycerol esters of fatty acids can be employed there are preferably employed triglycerol to decaglycerol esters of higher fatty acids, (e.g., containing 12 to 22 carbon atoms in the fatty acid). The most suitable polyglycerol esters are partial esters, i.e. they have one or more free hydroxyl groups and hence have both hydrophilic and lipophilic characteristics.

Examples of suitable polyglycerol esters are triglycerol monostearate,
triglycerol monoshortening (triglycerol mono ester of the acids of cottonseed oil),
triglycerol monooleate,
hexaglycerol monostearate,
hexaglycerol monoshortening,
hexaglycerol monooleate,
hexaglycerol dioleate,
hexaglycerol dishortening,
hexaglycerol hexaoleate,
decaglycerol monostearate,
decaglycerol monoshortening,
decaglycerol monooleate,
decaglycerol monolaurate,
decaglycerol tristearate,
decaglycerol trishortening,
decaglycerol trioleate,
decaglycerol trilinoleate,
decaglycerol decastearate,
decaglycerol decaoleate,
decaglycerol decalinoleate,
decaglycerol tetraoleate,
diglycerol monostearate,
dodecaglycerol hexapalmitate,
decaglycerol tripalmitate,
decaglycerol diarachinate,
triglycerol mono behenate,
dodecaglycerol trilignocerate,
decaglycerol mono linolenate,
hexa glycerol diricinoleate,
decaglycerol deca myristate,
decaglycerol tri ester of soybean oil acids,
decaglycerol tetra ester of cottonseed oil acids,
hexaglycerol mono ester of coconut oil acids,
triglycerol mono ester of peanut oil acids,
decaglycerol deca ester of corn oil acids,
decaglycerol ester deca ester of hydrogenated cottonseed oil acids.

There can also be used glycol esters such as propylene glycol monostearate, dipropylene glycol monostearate, propylene glycol monooleate, butylene glycol monostearate and butylene glycol monopalmitate.

The encapsulated product may contain one or more encapsulated material which is desired to be introduced into the body. Examples of encapsulated materials are food and/or medicines such as laxatives, enzyme, flavoring agents, coloring agents, and other fat soluble materials.

As flavoring agents there may be used peppermint oil, banana oil, lemon oil, vanilla and other flavors for bread or cake where the vital gluten is not denatured until near the end of the baking process, e.g., almond, bread culture flavor, orange oil, diacetyl, etc. The coloring agents which can be used in the present invention are annato, tumeric, β-carotene, etc.

Examples of medicaments which may be used include phenolphthalein (a laxative), antihistamines, blood pressure depressants, Vitamines A, D, E and K, phenylbutazone, thiopental, p-toluidine, aniline, m-nitroaniline, benzoic acid, phenol, p-nitroaniline, p-hydroxy propiophenone, salicyclic acid, m-nitrobenzoic acid, aminopyrine, acetyl salicylic acid, acetaniline, theophylline, antipyrine, barbitol, theobromine, sulfanilamide, p-hydroxybenzoic acid, etc.

The invention is further illustrated by the following specific examples. Unless otherwise indicated all parts and percentages are by weight.

EXAMPLE I

The following composition was mixed together in the procedure described below:

| Ingredient | Parts |
|---|---|
| 92° cocoanut oil | 5.35 |
| Peppermint oil | 5.0 |
| Drewpol 10-10-S (decaglycerol decastearate) | 1.5 |
| Vital wheat gluten solids | 10 |
| Dextrin (corn) | 29 |

NH$_4$OH, to bring pH to 9.5.
Water, to make 27% total solids dispersion.

The NH$_4$OH was added to lukewarm water and the gluten was dissolved therein with strong agitation for 15-30 minutes. The dextrin was then added. The mixture was then heated to 140° F. and the Drewpol 10-10-S emulsifier and the 92° cocoanut oil added. The mixture was pasteurized at 150-160° F. for 20 minutes. The mixture was then cooled to 130° F. and the peppermint oil added with stirring. The mixture was then homogenized at 1500 p.s.i. and spray dried.

The ammonia was substantially completely driven off during the drying step, leaving the dried and encapsulated product with a film or layer of gluten which is insoluble in neutral aqueous solution. In addition, gluten itself is a food and contributes to the nutritious value of the encapsulated product.

To control the degree and speed of release of the encapsulated material, the amount of gluten in the finished encapsulated product can be varied. Thus, gum acacia, a compatible but relatively solid colloid, can be substituted in part for the gluten. To increase the degree or rate of solution, gum acacia may be substituted for 5 to 40% of the gluten. Furthermore, the dextrin in the above example can be substituted by gum arabic. Other carbohydrate materials such as modified starches may also be used.

EXAMPLE II

Example I was repeated except that the NH$_4$OH was replaced by enough acetic acid to make a 0.05 N solution and the peppermint oil was replaced by β-carotene. Results similar to Example I were obtained.

EXAMPLE III

The procedure of Example II was repeated replacing the decaglycerol decastearate by the same amount of decaglycerol tristearate.

EXAMPLE IV

The procedure of Example II was repeated but the decaglycerol decastearate was replaced by the same amount of glycerol lacta mono palmitate and the peppermint oil was replaced by phenolphthalein.

The amount of each ingredient which may be used in the product of the present invention can be varied within wide limits. Thus, the amount of one ingredient to be used may depend on the nature of the other ingredients present. In general, however, we prefer the following ranges for the ingredients listed:

| Ingredients: | Range, percent by weight dry basis |
|---|---|
| Fat | 30–70 |
| Encapsulated material | 1–20 |
| Emulsifying agent | 0–5 |
| Gluten | 1–20 |
| Carbohydrates | 5–50 |

In addition, either ammonium hydroxide or acetic acid may be used. When ammonium hydroxide is employed, a sufficient amount should be used to produce a pH of about 8.5 to about 10.5. If acetic acid is used, enough acetic acid should be present to make about a 0.05 to 0.5 N solution.

What is claimed is:

1. An encapsulated, dried product comprising 1 to 20% of an enveloping wheat gluten film encapsulating an oil in water dispersion wherein 30 to 70% of an oil or fat is a carrier for 1 to 20% of a material selected from the group consisting of fat soluble food, medicaments, flavoring agents and food coloring agents, said percentages being by weight on a dry basis.

2. An encapsulated product according to claim 1 further comprising a member of the group consisting of dextrin, gum acacia and modified starches as part of the encapsulating wheat gluten film.

3. An encapsulated product according to claim 1 wherein the fat is cocoanut oil.

4. An encapsulated product according to claim 1 wherein the encapsulated material is a fat soluble medicament.

5. An encapsulated product according to claim 1 wherein the encapsulated material is a fat soluble flavoring agent.

6. An encapsulated product according to claim 1 wherein the encapsulated product is a fat soluble food coloring agent.

7. A process for preparing an encapsulated product comprising: admixing 1 to 20% wheat gluten, water and a gluten-modifying agent selected from the group consisting of acetic acid and ammonia until the gluten is finely dispersed, dispersing the gluten dispersion in 30 to 70% of an oil or fat to form an oil in water dispersion, said oil or fat being the carrier for 1 to 20% of a product to be encapsulated selected from the group consisting of fat soluble food, medicament, flavoring agents and food coloring agents, pasteurizing and homogenizing said dispersion and drying the pasteurized and homogenized dispersion to obtain the encapsulated product having an enveloping wheat gluten film thereon, said percentages being by weight on a dry basis.

8. A process according to claim 7 wherein said drying is spray drying.

9. A process according to claim 8 wherein an emulsifying agent is added to said mixture prior to drying.

10. A process according to claim 8 wherein said product to be encapsulated is a fat-soluble medicament.

11. A process according to claim 8 wherein said product to be encapsulated is a fat-soluble flavoring agent.

12. A process according to claim 8 wherein the product to be encapsulated is a fat-soluble food coloring agent.

(References on following page)

References Cited

UNITED STATES PATENTS

| | | | |
|---|---|---|---|
| 874,310 | 12/1907 | Donard et al. | 167—82 |
| 2,340,425 | 2/1944 | Pitkin | 167—83 X |
| 2,461,829 | 2/1949 | Lowen | 106—136 |
| 2,846,353 | 8/1958 | Pipher | 167—83 |
| 2,895,880 | 7/1959 | Rosenthal | 167—82 |
| 3,016,308 | 1/1962 | Macaulay | 252—316 X |
| 3,041,289 | 6/1962 | Katchen et al. | 252—316 |
| 3,091,567 | 5/1963 | Wurzburg et al. | 167—83 X |
| 3,116,206 | 12/1963 | Brynko et al. | 167—83 |
| 3,159,585 | 12/1964 | Evans et al. | 252—316 |

LEWIS GOTTS, *Primary Examiner.*

S. K. ROSE, *Assistant Examiner.*